United States Patent [19]
Jones et al.

[11] Patent Number: 5,272,725
[45] Date of Patent: Dec. 21, 1993

[54] DIGITAL VIDEO QUANTIZER

[75] Inventors: James B. Jones, Lighthouse Pt.; Celeo R. Mandujano, Boca Raton; Vasan Venkataraman, Fort Lauderdale; Constantinos S. Kyriakos, Boca Raton, all of

[73] Assignee: AlliedSignal Inc., Morris Township, Morris County, N.J.

[21] Appl. No.: 961,048

[22] Filed: Oct. 14, 1992

Related U.S. Application Data

[63] Continuation of Ser. No. 660,499, Feb. 25, 1991, abandoned.

[51] Int. Cl.⁵ .................................. H03K 5/22
[52] U.S. Cl. ........................... 375/76; 328/114; 307/356; 342/197
[58] Field of Search ............ 375/76; 370/108; 328/114–117; 307/355–356; 342/37, 197

[56] References Cited

U.S. PATENT DOCUMENTS

| | | | |
|---|---|---|---|
| 3,188,629 | 6/1965 | Humpherys | 343/6.3 |
| 3,415,950 | 12/1968 | Bartz et al. | 178/7.1 |
| 3,696,415 | 10/1972 | Ballantyne | 342/197 |
| 3,705,402 | 12/1972 | Ballantyne et al. | 342/40 |
| 3,713,022 | 1/1973 | McRay | 328/115 |
| 3,732,563 | 5/1973 | Nelson | 342/40 |
| 3,746,982 | 7/1973 | Allington et al. | 328/114 |
| 4,044,352 | 8/1977 | Wilmot | 342/197 |
| 4,161,628 | 7/1979 | McRae | 375/76 |
| 4,387,465 | 6/1983 | Becker | 375/76 |
| 4,395,773 | 7/1983 | Philippides et al. | 375/116 |
| 4,479,266 | 10/1984 | Eumurian et al. | 375/76 |
| 4,654,862 | 3/1987 | Camborde et al. | 375/76 |
| 4,796,030 | 1/1989 | Colotti et al. | 342/40 |
| 4,899,157 | 2/1990 | Sanford et al. | 342/40 |

*Primary Examiner*—Curtis Kuntz
*Assistant Examiner*—Young Tse
*Attorney, Agent, or Firm*—Howard G. Massung

[57] ABSTRACT

A digital video quantizer for use in TCAS and ATCRBS/SIF systems. A digital delay receives a digitized video signal and produces a plurality of delayed digital signals which are used throughout the quantizer. A threshold generator then produces a predetermined threshold and a dynamic threshold, and a quantized video generator compares one of the delayed digitized signals to a threshold to produce a quantized video signal. A slope quantizer detects a slope of the digitized signal which exceeds either a positive or negative threshold. In addition, a rise time detector detects an excessive rise time in the digitized video signal, and a chip amplitude comparator provides a signal which is used in detecting Mode S data bit values. The digital video quantizer's use of digital references rather than analog references, eliminates the inaccuracies caused by a reference voltage varying over time or temperature. The digital references also facilitate modification of the reference values at a later time.

19 Claims, 4 Drawing Sheets

DIGITAL VIDEO QUANTIZER

This application is a continuation of application Ser. No. 660,499 filed Feb. 25, 1991, now abandoned.

BACKGROUND OF THE INVENTION

1. Field of the Invention

The present invention relates generally to decoding Pulse Code Modulation (PCM) signals used in air traffic control radar beacon systems/selective identification feature (ATCRBS/SIF) and in airborne traffic alert and collision avoidance systems (TCAS). More specifically, this invention relates to a digital video quantizer which is used to process a PCM signal before it is decoded.

2. Description of the Related Art

The ATCRBS/SIF system comprises a ground based interrogator which transmits a query to an airborne transponder. In a TCAS system, both the interrogator and transponder are airborne and provide a means for communication between aircraft. The transponder responds to the query by transmitting a reply which is received and processed by the interrogator. The interrogator includes a receiver, an analog to digital converter (A/D), a video quantizer, a leading edge detector, and a decoder.

The reply received by the interrogator consists of a series of information pulses which may identify the aircraft, or contain altitude or other information. The reply is a PCM signal which is transmitted in either a ATCRBS format or in a Mode S format.

The ATCRBS format comprises a first and a second framing pulse with 13 information pulses positioned between them. Information is conveyed by either the presence or absence of an information pulse. The pulses have a nominal width of 0.45 microseconds, and have a spacing of 1.45 microseconds between leading edges. The leading edges of the first and second framing pulses are 20.3 microseconds apart. In some cases the second framing pulse is followed by a special position identification (SPI) pulse beginning 4.35 microseconds after the leading edge of the second framing pulse.

The Mode S format comprises a 6 microsecond preamble and a data block which is either 50 or 112 microseconds long. The preamble consists of four 0.5 microsecond pulses. The leading edges of the first and second pulses are 1 microsecond apart. The third pulse begins 3.5 microseconds after the leading edge of the first pulse, and the fourth pulse begins 4.5 microseconds after the leading edge of the first pulse. The data block begins 6 microseconds after the leading edge of the first pulse of the preamble. The data block is divided into 1 microsecond wide bit positions where each bit position contains 2 consecutive 0.5 microsecond pulse positions or chips. If a pulse is located in the first position it is considered to be set, and if it is located in the second position it is considered to be cleared.

Video quantizers used in the past were analog units which used operational amplifiers, and sample and hold devices. The operational amplifiers were used to add, subtract and compare signals, and the sample and holds were used to generate dynamic thresholds.

Analog video quantizers have several drawbacks. Using operational amplifiers to compare signals against a threshold requires the use of analog voltages to represent a threshold. Analog reference voltages require manual adjustment, and their values drift with time and temperature. In addition, thresholds based on the output of a sample and hold device have variations resulting from the decay of the sample and hold's output.

SUMMARY OF THE INVENTION

The present invention is an apparatus for quantizing and analyzing a digitized video signal comprising a plurality of delay means for delaying the digitized video signal to produce a plurality of delayed digitized signals, a first comparative means for comparing a delayed digitized signal to a threshold to produce a quantized video signal, and means for detecting when the slope of the digitized video signal exceeds a predetermined threshold.

The present invention's use of digital electronics eliminates the shortcomings of the aforementioned analog video quantizer. The use of digital electronics eliminates the need for analog reference voltages. The reference voltages are now represented as binary numbers which can easily be programmed or modified without time consuming manual adjustments. In addition, the digital references do not vary with time and temperature. The present invention also eliminates the use of a sample and hold in the video quantizer. Samples of the input signal are stored in digital form in registers, and therefore do not suffer from the output decay that is experienced with a sample and hold.

DESCRIPTION OF THE PREFERRED EMBODIMENT

Figure 1:
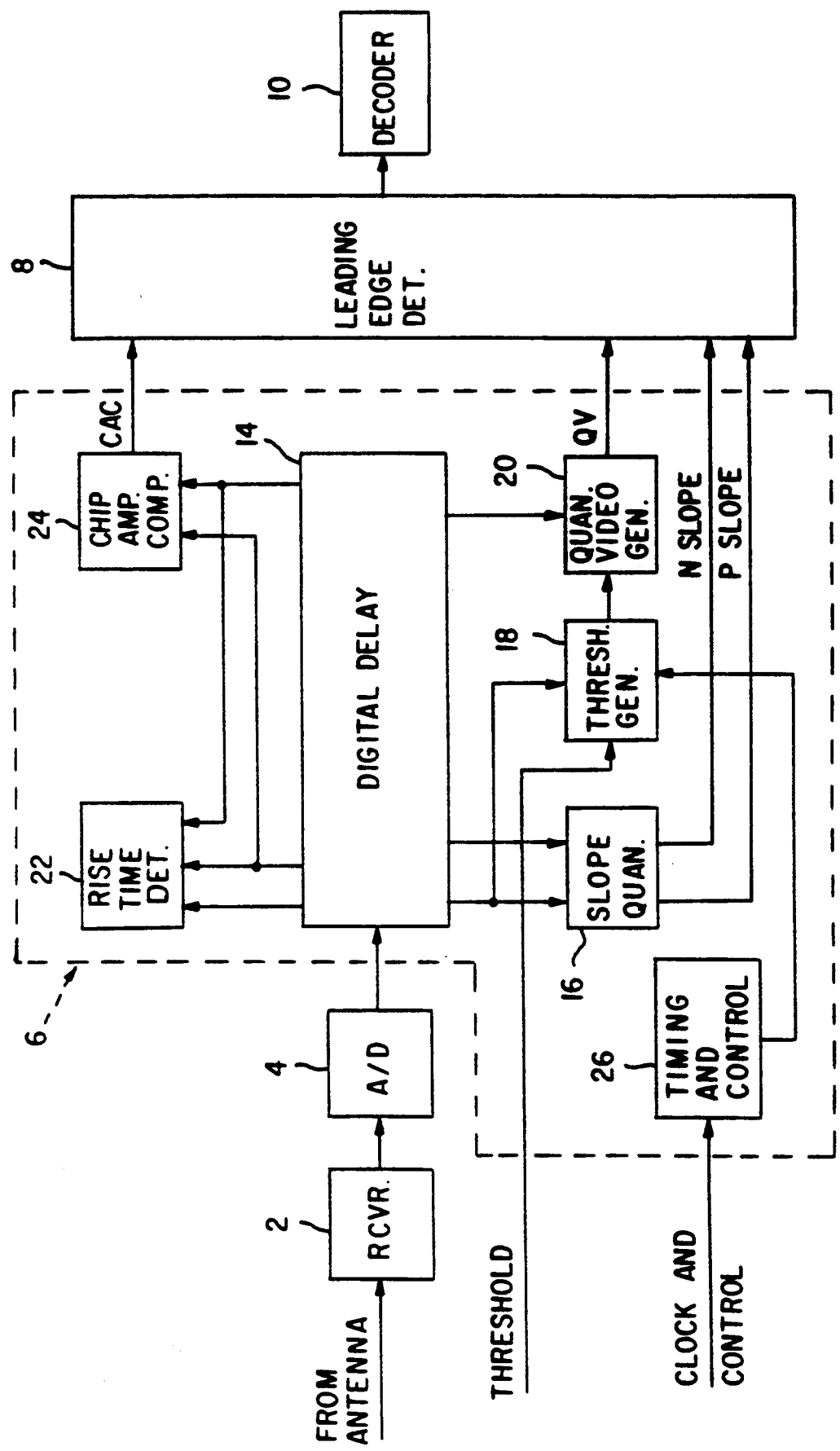
FIG. 1 is a simplified block diagram of the reply processing portion of an interrogator, and includes a detailed block diagram of the digital video quantizer.

A digital video quantizer is one component of the reply processor for a TCAS or a ATCRBS/SIF system. FIG. 1 is a simplified block diagram of a reply processor.

The reply processor comprises receiver 2, analog to digital converter (A/D) 4, digital video quantizer 6, leading edge detector 8, and decoder 10. Receiver 2 converts the reply from a transponder into an analog video signal. A/D 4 converts the analog video signal into a digitized video signal. Video quantizer 6 quantizes and analyzes the digitized video signal to produce four outputs which are received by leading edge detector 8. Leading edge detector 8 uses these outputs to determine the location of the leading edges of the pulses in the transponder's reply. The leading edge detector produces an output consisting of pulses which correspond to the leading edges of the reply pulses. In addition, leading edge detector 8 passed signals CAC and QV to decoder 10. The decoder then interprets the outputs from the leading edge detector to extract a message.

The leading edge detector uses algorithms to insert or remove leading edges, and thereby minimizes the effects of FRUIT, garble and phantom replies. A detailed explanation of FRUIT, a garble, and phantom replies can be found in "Leading Edge Detector/Reply Quantizer", U.S. Pat. No. 4,899,157 which issued on Feb. 6, 1990, the contents of which are hereby incorporated by reference.

In the preferred embodiment, the digital quantizer and the leading edge detector are located in the same hybrid circuit.

Digital video quantizer 6 comprises digital delay 14, slope quantizer 16, threshold generator 18, quantized video generator 20, rise time detector 22, chip amplitude comparator 24, and timing and control circuitry 26.

Digital delay 14 receives the digitized video signal from A/D 4. The digital word can be of any width, but it is preferable to use an 8 bit wide word. Digital delay 14 delays the 8 bit wide digitized video signal in increments of one clock period.

Slope quantizer 16 measures the slope of the digitized video signal, and compares it against a positive and a negative slope threshold. If the measured slope exceeds the negative slope threshold, such an occurrence is indicated to leading edge detector 8 via signal NSLOPE. If the measured slope exceeds the positive slope threshold, such an occurrence is indicated to leading edge detector 8 via signal PSLOPE.

Threshold generator 18 produces a threshold which is used to generate quantized video. The threshold generator produces a preprogrammed video threshold or a dynamic video threshold.

Quantized video generator 20 receives the threshold produced by threshold generator 18, and produces quantized video. Leading edge detector 8 receives the quantized video via signal QV.

Rise time detector 22 monitors the rise time of the digitized video signal. If the rise time exceeds a predetermined amount, the dynamic video threshold of threshold generator 18 is disabled.

Chip amplitude comparator 24 is used during Mode S operations. The chip amplitude comparator compares the signal amplitude in the first chip of a data bit position, with the signal amplitude in the second chip of the data bit position. The results of this comparison are communicated to leading edge detector 8 via signal CAC.

Timing and control circuitry 26 receives the clock and several other control signals from the TCAS or ATCRBS/SIF system. The timing and control circuitry buffers the clock, and resets the dynamic video threshold generator.

Figure 2:
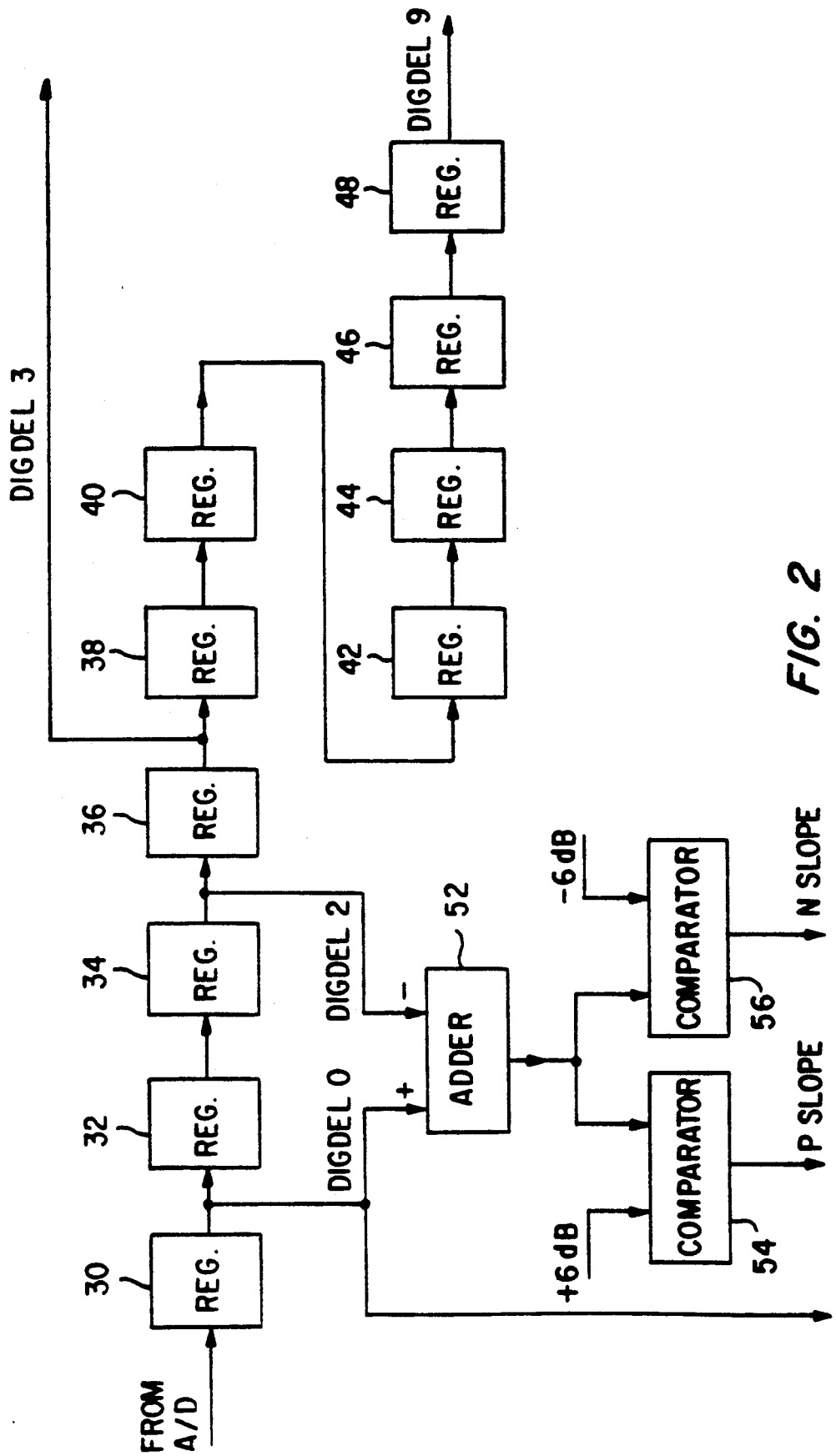
FIG. 2 is a logic diagram of the digital delay line and the slope quantizer.

FIG. 2 illustrates the logic diagram of digital delay 14. The digital delay receives the 8 bit wide words which compose the digitized video signal. The digitized video signal words are delayed in steps of one clock period. An output is available from the digital delay at each of the one step increments.

Digital delay 14 comprises a plurality of 8 bit registers which are connected in series. In the preferred embodiment, ten registers are used. The register outputs are fed to the inputs of the next register in line so that the data is shifted one register for each clock period. Delay register 30 receives its input from A/D 4, and has its output connected to the input of delay register 32. The output of delay register 32 is connected to the input of delay register 34, and delay register 34 has its output connected to the input of delay register 36. The output of delay register 36 is connected to the input of delay register 38, and delay register 38 has its output connected to the input of delay register 40. The output of delay register 40 is connected to the input of delay register 42, and the output of delay register 42 is connected to the input of delay register 44. The output of delay register 44 is connected to the input of delay register 46, and the output of delay register 46 is connected to the input of delay register 48.

The output of each 8 bit register can be made available to each of the other portions of the digital video quantizer. In the preferred embodiment, the output of delay register 30 is used by a slope quantizer 16, threshold generator 18, rise time detector 22, and chip amplitude comparator 24. The output of delay register 34 is connected to slope quantizer 16, and the output of delay register 36 is connected to quantized video generator 20 and rise time detector 22. The output of delay register 48 is connected to rise time detector 22 and chip amplitude comparator 24.

It is also possible to construct a digital delay using a plurality of shift registers, a random access memory, or flip-flops.

Slope quantizer 16 measures the slope of the digitized video signal using data from two different points on digital delay 14. The measured slope is compared against a negative and a positive slope threshold to create output signals which indicate a slope of the digitized video signal to leading edge detector 8.

The slope quantizer comprises adder 52, and comparators 54 and 56. Adder 52 is used to take the difference between data from two different points on digital delay 14. Signal DIGDEL2, which is produced by delay register 34, is subtracted from signal DIGDEL0, which is produced by delay register 30. The resulting difference is produced by adder 52, and is then connected to comparators 54 and 56. Comparator 54 compares the difference with a binary number which has an equivalent value of +6 dB. If the difference exceeds +6 dB, comparator 54 produces signal PSLOPE. Signal PSLOPE is connected to leading edge detector 8, and indicates that the digitized video signal has a positive slope which exceeds +6 dB per two clock periods. Likewise, comparative 56 compares the difference from adder 52 with a binary number that has an equivalent value of −6 dB. When the difference is less then −6 dB, comparator 56 outputs signal NSLOPE to leading edge detector 8, and thereby indicates that the digitized video signal has a slope more negative than −6 dB per two clock periods.

The +6 dB and −6 dB references, which are used by comparators 54 and 56 respectively, can be stored, for example, in a register, a RAM, a PROM, or dip switches. Modification of the references is facilitated through the use of these devices.

Figure 3:
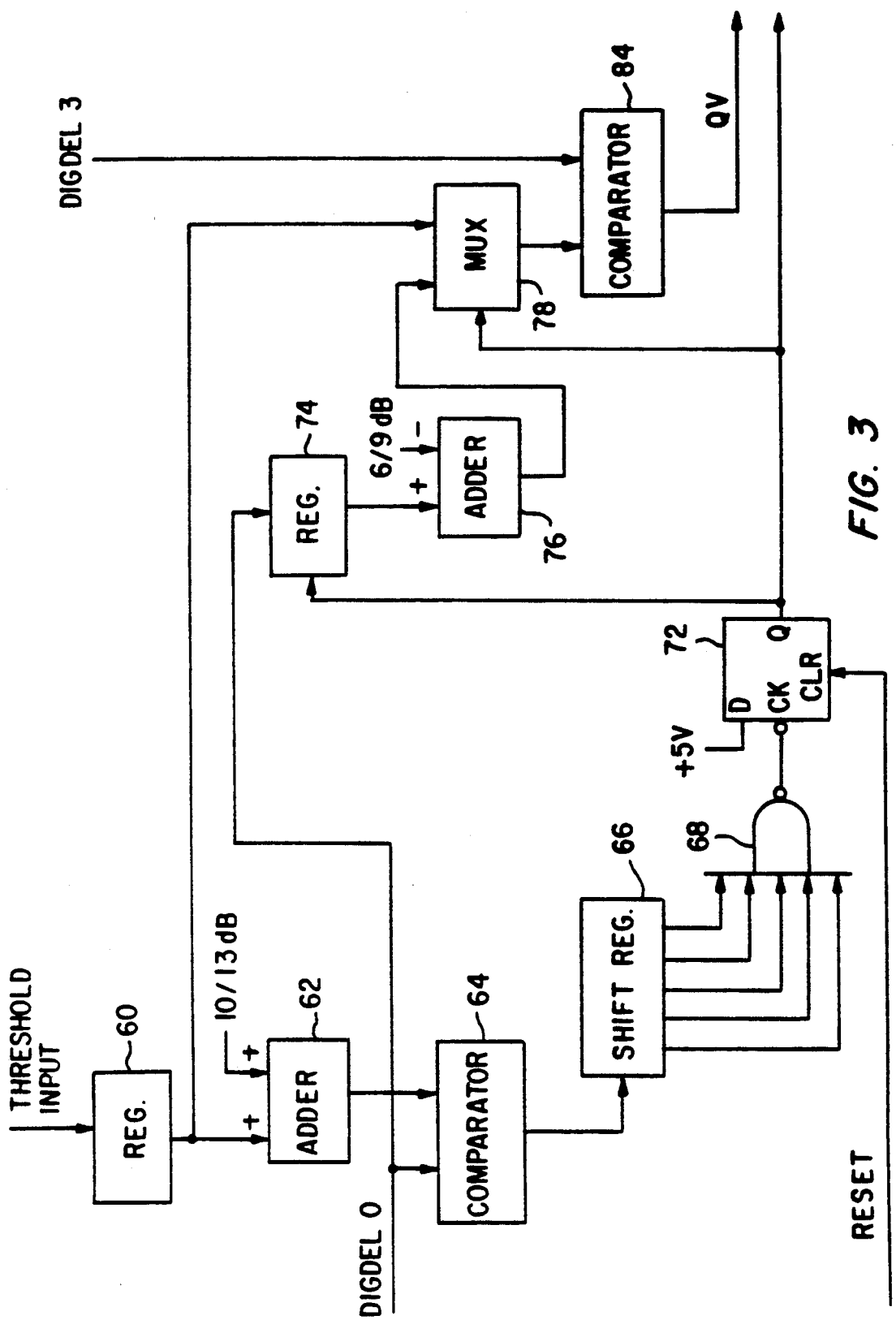
FIG. 3 is a block diagram of the video threshold generator and the quantized video generator.

FIG. 3 contains a logic diagram of threshold generator 18. The threshold generator provides a threshold which is compared to the digitized video signal to produce a quantized video signal. The threshold generator provides either a preprogrammed video threshold or a dynamic video threshold. The dynamic threshold is based on a sample of the digitized video signal.

Threshold generator 18 comprises a register for storing the preprogrammed video threshold, dynamic holdoff and narrow pulse detection logic, dynamic threshold generation logic, and threshold select logic.

Register 60 stores the preprogrammed video threshold. This threshold is loaded into the register by the interrogator system's control microprocessor. It should be noted that register 60 can be replaced, for example, with a PROM, a RAM or dip switches.

The dynamic holdoff and narrow pulse detection logic prevents creating a dynamic video threshold which is based on a digitized video signal pulse that is below a holdoff threshold, or that has a width which is less than five clock periods. This logic is comprised of adder 62, comparator 64, shift register 66 and NAND gate 68. The preprogrammed video threshold stored in register 60 is connected to an input of adder 62. Adder 62 adds a binary number to the preprogrammed video threshold to produce a dynamic holdoff threshold. The number added to the preprogrammed video threshold is a binary number corresponding to 13 or 10 dB. 13 dB is used for ATCRBS mode and 10 dB is used for Mode S. These values can be provided to adder 62 by using, for example, a register, a RAM, a PROM or dip switches.

The dynamic holdoff threshold from adder 62 is connected to comparator 64. Comparator 64 compares the dynamic holdoff threshold with signal DIGDEL0 from delay register 30. When DIGDEL0 is greater than the dynamic holdoff threshold, comparator 64 sends a logic 1 to shift register 66. Five bit shift register 66 then shifts the signal from comparator 64 one position for each clock pulse. Five consecutive parallel outputs from shift register 66 are connected to five inputs of NAND gate 68. NAND gate 68 produces a logic 0 signal when signal DIGDEL0 has exceeded the dynamic holdoff threshold for five consecutive clock pulses.

The dynamic video threshold generation logic comprises D flip-flop 72, register 74 and adder 76. D flip-flop 72 receives the output from NAND gate 68 as a clock input. When D flip-flop 72 is clocked, the logic 1 level at the D input is transferred to the Q output of the flip-flop. The Q output of D flip-flop 72 is connected to the clock input of register 74. Register 74 samples signal DIGDEL0 when it receives a logic level 1 from the Q output of D flip-flop 72. The dynamic video threshold is generated from this latched or sampled value of the digitized video signal. The output of register 74 is connected to a first input of adder 76. Adder 76 is used to subtract 6 dB or 9 dB from the sampled value of the digitized video signal. The 6 dB or 9 dB value is provided to a second input of adder 76 as a binary number. These values can be stored, for example, in a register, a RAM, a PROM or dip switches. The 6 dB value is used in Mode S operations, and the 9 dB value is used in ATCRBS operations. The output of adder 76 is the dynamic video threshold.

An advantage of using a dynamic video threshold is that weak replies, which may result from distant or multipath returns, are ignored in favor of stronger replies.

The remaining portion of threshold generator 18 is the threshold select logic. This section provides quantized video generator 20 with a video threshold. It selects between the dynamic video threshold and the preprogrammed video threshold. The threshold select logic is comprised of 2 to 1 multiplexer 78 which has a select line controlled by the Q output of D flip-flop 72. Multiplexer 78 receives the dynamic video threshold on a first input from adder 76, and the preprogrammed video threshold on a second input from register 60. When the Q output of D flip-flop 72 has a value of logic 1, multiplexer 78 provides the quantized video generator with the dynamic video threshold. When the Q output of D flip-flop 72 has a value of logic 0, multiplexer 78 outputs the preprogrammed video threshold.

Once the dynamic video threshold is selected, it remains active until the clear input of D flip-flop 72 is activated. Activating the clear input lowers the Q output of D flip-flop 72 to logic 0, and thereby deselects the dynamic video threshold.

Quantized video generator 20 comprises comparator 84. The quantized video generator compares the digitized video signal with a video threshold to create quantized video which is connected to leading edge detector 8 via signal QV. Comparator 84 receives the video threshold from multiplexer 78 on a first input, and receives signal DIGDEL3 from delay register 36 on a second input. Whenever signal DIGDEL3 is greater than the video threshold, comparator 84 provides a logic 0 on signal QV to indicate that the digitized video signal has exceeded the video threshold.

Figure 4:
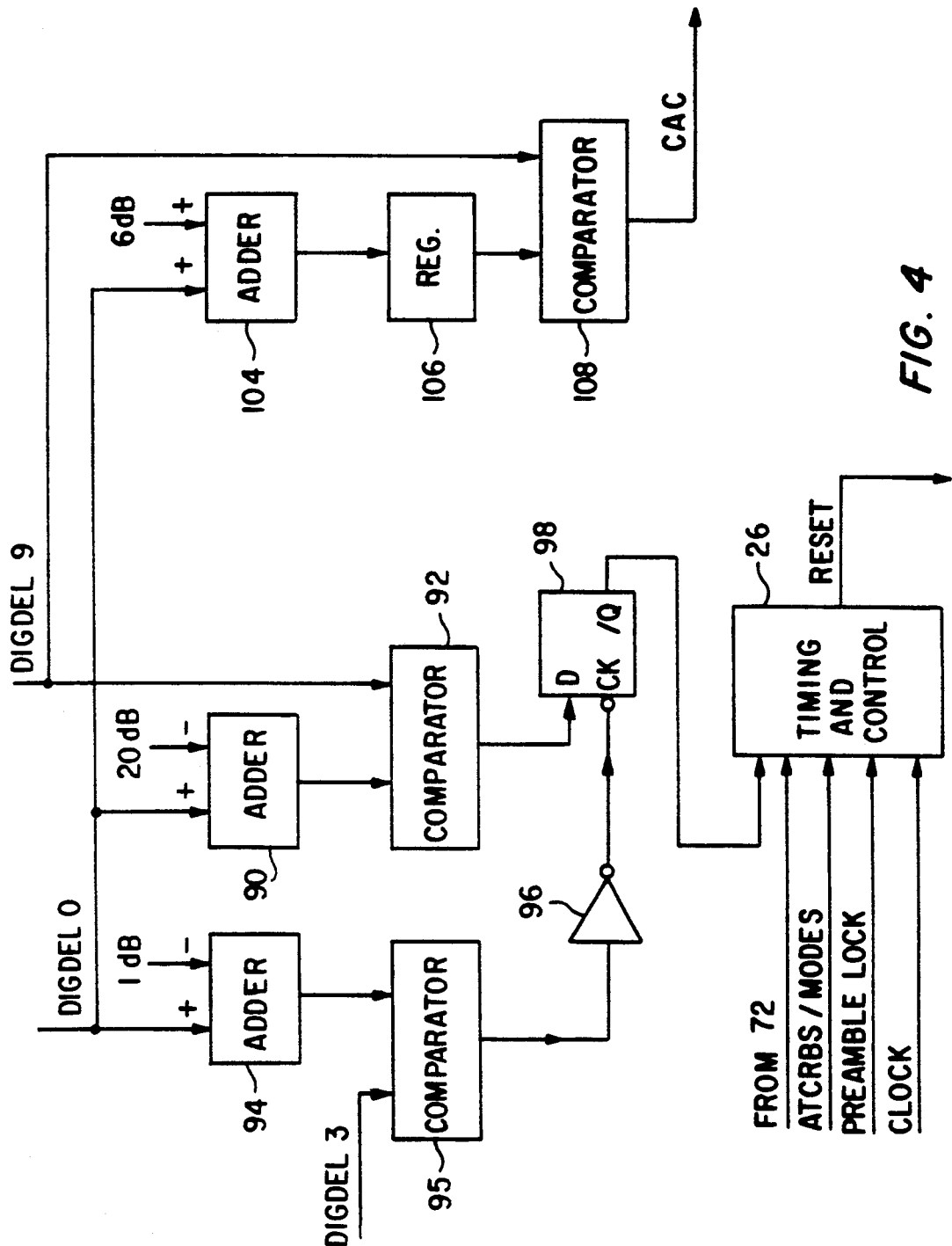
FIG. 4 is a logic diagram of the rise time detector, the chip amplitude comparator, and the timing and control circuitry.

FIG. 4 contains a logic diagram of rise time detector 22. The rise time detector detects a digitized video signal pulse with an excessive rise time. The detector uses samples of the digitized video signal which are separated by 9 clock periods. Other separations can be used, but it is preferable to use 9 clock periods. An excessive rise time is declared if, a sample delayed by 10 clock periods is less than 20 dB down from a sample delayed by 1 clock period, while a sample delayed by 4 clock periods is within 1 dB of the sample delayed by 1 clock period.

The rise time detector comprises a 20 dB detection circuit, a 1 dB detection circuit and a D flip-flop. The 20 dB detection circuit creates a 20 dB threshold by subtracting 20 dB from a sample of the digitized video signal. The 20 dB detection circuitry is comprised of adder 90 and comparator 92. Adder 90 receives signal DIGDEL0 from delay register 30 on a first input, and receives a binary number equivalent to 20 dB on a second input. Adder 90 subtracts the binary number from signal DIGDEL0. The binary number representing 20 dB can be stored, for example, in a register, a RAM a PROM or dip switches. The output of adder 90 is a 20 dB threshold which is compared with signal DIGDEL9 from delay register 48. Comparator 92 compares the 20 dB threshold and signal DELDIG9, and provides an output of logic level 0 when the 20 dB threshold is exceeded by signal DIGDEL9.

The 1 dB detection circuit creates a threshold by subtracting 1 dB from signal DIGDEL0. The 1 dB threshold is then compared with signal DIGDEL3 from delay register 36. Adder 94 is used to subtract a binary number equivalent to 1 dB from signal DIGDEL0. The binary number representing 1 dB can be stored, for example, in a register, a PROM, a RAM or dip switches. The output of adder 94 is the 1 dB threshold. Comparator 95 compares the 1 dB threshold with signal DIGDEL3. The output of comparator 95 will transition from a low to a high when signal DIGDEL3 exceeds the 1 dB threshold. The output of comparator 95 is inverted by inverter 96, and the output of inverter 96 is connected to the clock input of D flip-flop 98.

D flip-flop 98 is used to latch the occurrence of an excessively long rise time. D flip-flop 98 receives the output of comparator 92 on its D input, and receives the output of inverter 96 on its clock input. If the signal from comparator 92 is still at logic 0, when the clock input is activated by the output of inverter 96, a logic 1 will appear at the /Q output of the D flip-flop. When the /Q output assumes a value of logic 1, it indicates an excessive rise time to timing and control circuitry 26.

Chip amplitude comparator 24 compares two samples of the digitized video signal which are separated by approximately 0.5 microseconds. If the earlier sample exceeds the later sample by more than 6 dB, a chip amplitude compare (CAC) signal is activated. During Mode S operations, leading edge decoder 8 passes signal CAC to detector 10 so that the value of the Mode S data bits can be determined.

Chip amplitude comparator 24 comprises adder 104, register 106 and comparator 108. Adder 104 receives signal DIGDEL0 from delay register 30 on a first input, and receives a binary number equivalent to a value of 6 dB on a second input. The binary number representing 6 dB can be stored, for example, in a register, a RAM, a PROM or dip switches. Adder 104 sums its inputs to produce a chip amplitude compare threshold which is received by register 106. The threshold from register 106 is compared in comparator 108 with signal DIGDEL9 from delay register 48. When DIGDEL9 exceeds the threshold from register 106, comparator 108 produces an output of logic 0. An output of logic 0 indicates that the earlier sample of the digitized video signal exceeds the later sample by more than 6 dB. This information is then conveyed to leading edge detector 8 via signal CAC.

Timing and control circuitry 26 receives and buffers the input clock, and selects the preprogrammed video threshold by resetting threshold generator 18. The clock signal received and buffered by timing and control circuitry 26 is 16.000 MHz for ATCRBS, and is 16.552 MHz for Mode S.

The reset from timing and control circuitry 26 resets threshold generator 18 by clearing D flip-flop 72. Clearing D flip-flop 72 selects the preprogrammed video threshold via multiplexer 78. This reset occurs under several circumstances. When rise time detector 22 detects an excessive rise time, the threshold generator is reset. In addition, the output of D flip-flop 72 starts a programmable timer contained in timing and control circuitry 26. After a predetermined amount of time, this timer causes the threshold generator to be reset. In ATCRBS mode, the reset occurs 26 microseconds after the dynamic video threshold is selected, and in Mode S the reset occurs 6 microseconds after the dynamic video threshold is selected. In the case of Mode S, if a preamble lock is detected in the input signal, the 6 microsecond timeout is disabled and the reset will not occur until the preamble lock is removed. The timing and control circuitry is made aware of a preamble lock by a signal which is received from decoder 10. The timing and control circuitry also receives an input from the interrogator system's control microprocessor which indicates whether the digital video quantizer is operating in ATCRBS mode or Mode S.

The programmable timer contained in timing and control circuit 26 can be constructed in a variety of ways. One technique is to use a counter which can be preset to two different values. The first value will cause the counter to overflow and create a carry out signal after 26 microseconds, and the second value will cause the counter to overflow and create a carry out signal after 6 microseconds. This carry out signal can be used to help generate the reset signal for threshold generator 18. The other conditions which cause a reset can be accommodated for by using logic gates which are well known in the art.

At several points in the digital video quantizer an adder is used to take the difference between values. This can be accomplished by taking the two's compliment of the subtrahend. Taking the two's compliment can be accomplished by inverting the bits that make up the subtrahend while placing a logic level 1 at the carry-in input of the adder of interest.

The reference values given in dBs are converted to a binary number by the following formula:

$$\text{Binary Value} = 60mV/dB \times 256/5000mV \times \text{Value in dBs}$$

This formula is arrived at by noting that receiver 2 is a log receiver with an output of 60 mV/dB, and that A/D 4 produces an 8 bit word with a 5 volt dynamic range.

In the most preferred embodiment, the binary reference values and the preprogrammed threshold, are stored in registers which are loaded by the interrogator system's control microprocessor.

The power, ground, and clock connections have not been shown to simplify the figures. It should be noted that all devices receive the necessary power, ground, and clock connections.

We claim:

1. An apparatus for quantizing and analyzing a digitized video signal, comprising:
   (a) a plurality of delay means for delaying the digitized video signal and produce a plurality of delayed digitized signals;
   (b) first comparator means for comparing one of said delayed digitized signals to a video threshold to produce a quantized video signal; and
   (c) slope detection means for detecting a slope of the digitized video signal which exceeds a predetermined slope threshold.

2. The apparatus of claim 1, wherein said slope detection means comprises first adder means for taking the difference between a first and a second delayed digitized signal to produce a digitized slope signal.

3. The apparatus of claim 2, wherein said slope detection means comprises second comparator means for comparing said digitized slope signal and to a first predetermined slope threshold, and third comparator means for comparing said digitized slope signal and to a second predetermined slope threshold.

4. The apparatus of claim 1, further comprising threshold selection means for selecting between a predetermined video threshold and a dynamic video threshold to produce said video threshold.

5. The apparatus of claim 4, further comprising dynamic video threshold generation means for generating said dynamic video threshold, said dynamic video threshold generation means having sampling means for storing a sample of one of said delayed digitized signals, and second adder means for taking a difference between said sample and a first predetermined value.

6. The apparatus of claim 5, further comprising dynamic video threshold enabling means for enabling the selection of said dynamic video threshold, said dynamic video threshold enabling means having fourth comparator means for comparing one of said delayed digitized signals and said predetermined video threshold plus a second predetermined value to produce a comparison signal, and length detection means for detecting the length of said comparison signal.

7. The apparatus of claim 1, further comprising rise time detection means for detecting a rise time of the digitized video signal which exceeds a predetermined rise time value.

8. The apparatus of claim 7, wherein said rise time detection means comprises upper threshold generation means for producing an upper threshold, and lower threshold generation means for producing a lower threshold.

9. The apparatus of claim 8, wherein said upper threshold generation means comprises third adder arithmetic means for taking the difference between a first delayed digitized signal and a second predetermined value to produce said upper threshold, and said lower threshold generation means comprises fourth adder means for taking the difference between said first delayed digitized signal and a third predetermined value to produce said lower threshold.

10. The apparatus of claim 9, wherein said rise time detection means comprises fifth comparator means for comparing a second delayed digitized signal to said upper threshold, and sixth comparator means for comparing a third delayed digitized signal to said lower threshold.

11. An apparatus for quantizing and analyzing a digitized video signal, comprising:
 (a) a plurality of delay means for delaying the digitized video signal to produce a plurality of delayed digitized signals;
 (b) first comparator means for comparing one of said digitized signals and a video threshold to produce a quantized video signal;
 (c) threshold selection means for selecting between a predetermined video threshold and a dynamic video threshold to produce said video threshold; and
 (d) dynamic video threshold generation means for generating said dynamic video threshold, said dynamic video threshold generation means having sampling means for storing a sample of one of said delayed digitized signals, and first adder means for taking a difference between said sample and a first predetermined value.

12. The apparatus of claim 11, further comprising dynamic video threshold enabling means for enabling the selection of said dynamic video threshold, said dynamic video enabling means having second comparator means for comparing one of said delayed digitized signals to said predetermined video threshold plus a second predetermined value to produce a comparison signal, and length detection means for detecting the length of said comparison signal.

13. The apparatus of claim 11, further comprising rise time detection means for detecting a rise time of the digitized video signal which exceeds a predetermined rise time value.

14. The apparatus of claim 13, wherein said rise time detection means comprises upper threshold generation means for producing an upper threshold, and lower threshold generation means for producing a lower threshold.

15. The apparatus of claim 14, wherein said upper threshold generation means comprises second adder means for taking the difference between a first delayed digitized signal and a first predetermined value to produce said upper threshold and said lower threshold generation means comprises third adder means for taking the difference between said first delayed digitized signal and a second predetermined value to produce said lower threshold.

16. The apparatus of claim 15, wherein said rise time detection means comprises third comparator means for comparing a second delayed digitized signal to said upper threshold, and third comparator means for comparing a third delayed digitized signal to said lower threshold.

17. An apparatus for quantizing and analyzing a digitized video signal, comprising:
 (a) a plurality of delay means for delaying the digitized video signal to produce a plurality of delayed digitized signals;
 (b) first comparator means for comparing one of said delayed digitized signals and a video threshold to produce a quantized video signal;
 (c) threshold selection means for selecting between a predetermined video threshold and a dynamic video threshold to produce said video threshold;
 (d) slope detection means for detecting a slope of the digitized video signal which exceeds a predetermined slope threshold; and
 (e) rise time detection means for detecting a rise time of the digitized video signal which exceeds a predetermined rise time value.

18. A method of quantizing and analyzing a digitized video signal, comprising the steps of:
 (a) delaying the digitized video signal to produce a plurality of delayed digitized signals;
 (b) comparing one of said delayed digitized signals and a video threshold to produce a quantized video signal;
 (c) detecting a slope of the digitized video signal which exceeds a predetermined slope threshold; and
 (d) selecting between a predetermined video threshold and a dynamic video threshold to produce said video threshold.

19. The method of claim 18, further comprising the step of detecting a rise time of the digitized video signal which exceeds a predetermined rise time value.

* * * * *